March 17, 1953 W. V. CZARNECKI, JR., ET AL 2,631,892
OIL BURNER FILTER
Filed Feb. 21, 1950 2 Sheets—Sheet 1
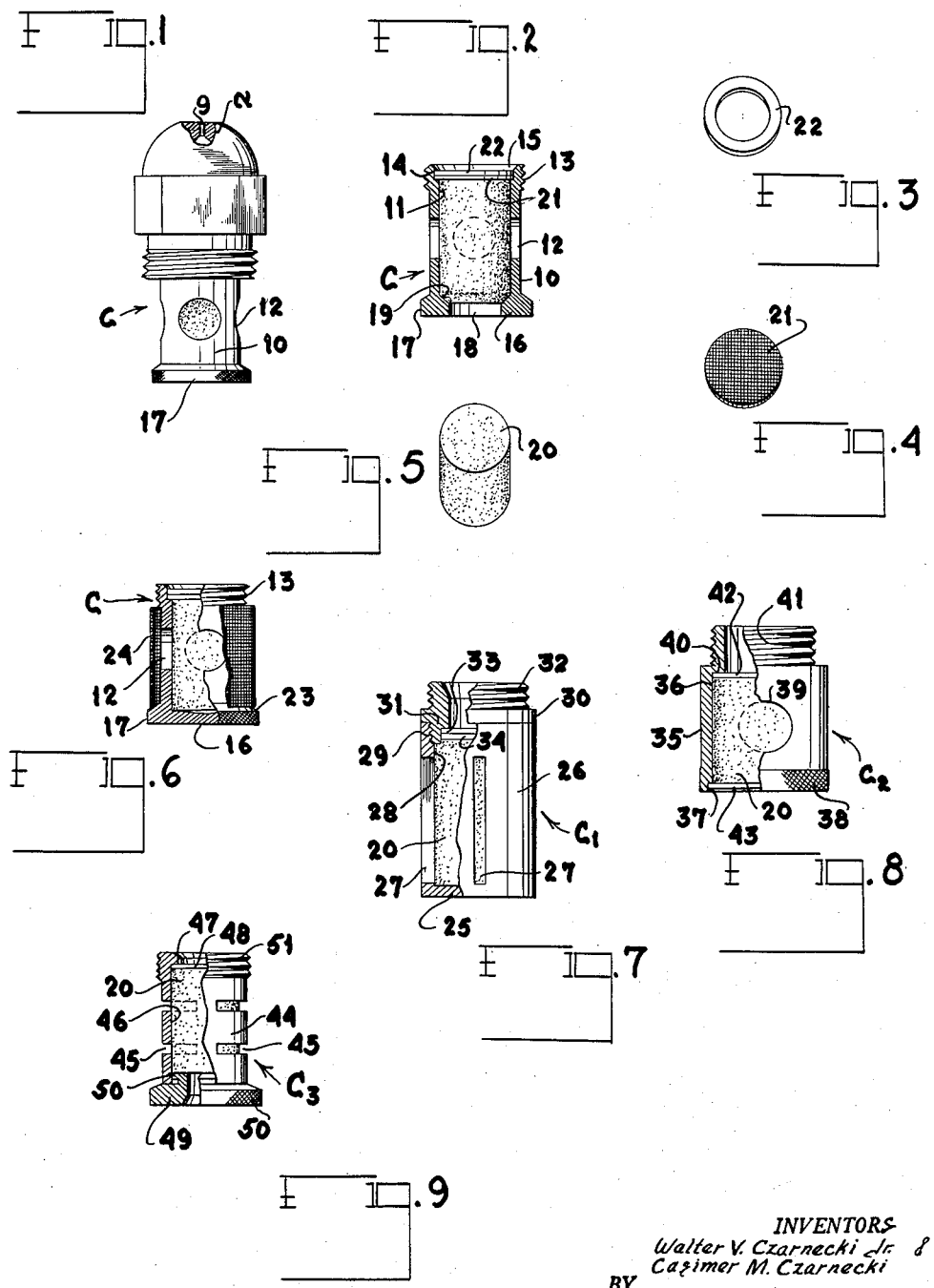
INVENTORS
Walter V. Czarnecki Jr. &
Cazimer M. Czarnecki
BY Joshua R. H. Potts
Their Attorney

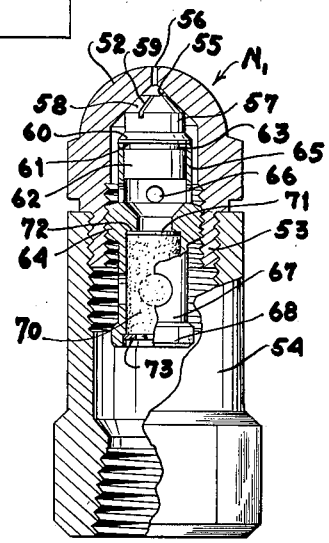

UNITED STATES PATENT OFFICE 2,631,892

OIL BURNER FILTER

Walter V. Czarnecki, Jr., Baederwood, and Casimer M. Czarnecki, Philadelphia, Pa., assignors to Eddington Metal Specialty Company, Eddington, Pa., a copartnership Application February 21, 1950, Serial No. 145,494

9 Claims. (Cl. 299—107)

The present invention relates to oil burner filters and is concerned primarily with a filter that is immediately associated with the spray nozzle of an oil burner.

At the present time just about every oil burner installation includes a spray nozzle. Such nozzles are characterized by the presence of a small orifice through which the oil is forced under pressure to give the atomized or spray effect. With the modern installations these orifices are often quite small, in some instances having a diameter of three one-thousandths of an inch. It is evident that such fine orifices are very easily clogged up by any fine solid particles which may be present in the fuel oil which is forced therethrough.

A modern oil burner installation also ordinarily includes a storage tank for the fuel oil and a pump for building up a required degree of pressure on the oil. Because of the danger of clogging up the orifice in the spray nozzle it has been the practice to include a filter of some type in the installation. This filter has either been located at the storage tank or at the pump. It is evident that in either case the filter is removed a substantial distance from the spray nozzle. With such an arrangement there is a very likely possibility that small particles of metal will come loose from the pipes or conduits through which the fuel oil passes in traveling from the filter to the spray nozzle. Such small particles constitute a serious hazard which has resulted in the closing of the orifice in the spray nozzle.

The condition above outlined has been recognized by those working in this field. In view of this recognition, certain arrangements have been provided in attempt to screen or filter the fuel oil at the nozzle itself. One of these known arrangements involves the use of a wire screen or mesh. In order to effectively screen the oil and insure that no fine solid particles will get to the orifice, it has been necessary to employ a very fine mesh. However, when such a fine mesh is employed, the wires forming the mesh become coated with a film of the fuel oil which passes therethrough and when subject to the heat of the burner this film solidifies with the ultimate result that the fine mesh is closed and no oil gets to the nozzle. Thus, the use of a wire screen or mesh, sufficiently fine to effectively screen the oil, is indicated as not practical.

Another arrangement has been to employ a composite filter which is in the nature of a stone. Such a filter comprises a porous block which is made of fine particles or granules of metal which are bonded together in such a manner as to afford the porosity necessary for a filter. Such a composite block has been located immediately adjacent to the spray nozzle. However, inasmuch as these filter blocks are subject to heat and pressure, it has been found that under practical conditions small particles of the filter block itself work loose and clog up the orifice in the spray nozzle.

With the foregoing conditions in mind, the present invention has in view, as a highly important objective, the provision of a spray nozzle having an orifice through which fuel oil is adapted to be passed under pressure together with a filter assembly which is immediately associated with the spray nozzle. This filter assembly includes as its characteristic element a mass of fibrous filter material such as felt through which the oil must pass in order to get to the spray nozzle.

In carrying out this idea in a practical embodiment a filter holder or cage is assembled directly on the spray nozzle. This filter holder takes the form of a cylindrical sleeve which has an opening communicating at one end with the spray nozzle and about which there is a threaded connection with the spray nozzle. A felt plug is received within this sleeve and the cylindrical wall is formed with a plurality of openings of a desired shape which permit oil to pass into the felt plug.

Another somewhat more detailed object of the invention is to provide, in a filter assembly of the character indicated, a wire screen or mesh which is positioned in the opening which communicates with the spray nozzle. Thus, after oil passes through the felt plug it must also pass through this screen in getting to the spray nozzle. This screen is a final insurance against any solid particles reaching the orifice in the spray nozzle.

Still another object of the invention is to provide, in a filter assembly of the character indicated, a filter holding cage having an end wall remote from the spray nozzle which is formed with an opening providing communication between the exterior thereof and the felt mass therein. In certain modified forms of the invention the opening of this wall may be omitted and the wall left without any opening.

Under certain conditions it is believed that it may be desirable to provide for a screening of the fuel oil before it is admitted to the felt plug. Accordingly, another highly important object of the invention is to provide, in a filter assembly of the type noted, a filter holding cage which is adapted to receive thereabout a cylindrical wire screen which overlies the openings in the cylindrical wall of the cage. The fuel oil must pass through this screen before it is admitted through the openings in the wall of the cage to the felt plug therewithin.

As above explained, it is desirable to provide a disc-like screen in the opening in the filter holding cage which communicates with the spray nozzle. This screen is held in position by the felt plug which bears thereagainst from the inside and a retaining ring which is positioned in the bore of the cage by a pressed fit. Such an arrangement does not particularly lend itself to replacement of the plug in the field at the site of the particular installation.

To the end of providing for replacement of a felt plug in the field, the invention has in view as a further object, the provision of a filter assembly of the character indicated which includes a filter holding cage that carries at one end an adapter. The adapter carries the wire screen and is removably positioned in the cage. Thus, the adapter may be removed to permit of replacement of the felt plug. The spray nozzle is in turn screwed onto the adapter.

One type of oil burner nozzle with which this invention is concerned comprises a dome-like member formed with the small orifice above mentioned which opens into an internal conical seat. Engaging this seat is a core member formed with diagonal kerfs, the inner ends of which terminate a slight distance from the orifice. Another highly important object of the invention is to provide, in combination with an oil burner nozzle of the type above indicated, a filter assembly including a filter holding cage having a tubular extension which extends up into the nozzle proper and engages the core member to hold the latter in position.

Ordinarily the oil burner nozzle has a neck or extension which is externally threaded and screwed into a body or coupling which is in turn connected to a conduit leading to the source of supply of fuel oil. It is an established fact that the internal threads on this body or coupling member are standardized throughout the industry; whereas, the threaded socket on the nozzle itself will vary with different manufacturers. Thus, another highly important object of the invention is to provide a filter assembly which is adapted to be mounted on the body or coupling rather than on the nozzle proper, although in immediate proximity to the latter.

Various other more detailed objects and advantages of the invention such as arise in connection with carrying out the above noted ideas in a practical embodiment will, in part become apparent, and in part be hereinafter stated as the description of the invention proceeds.

The invention, therefore, comprises a filter assembly which is immediately associated with the spray nozzle of an oil burner and which includes as its characteristic element a felt plug or mass through which oil is forced under pressure immediately before the oil is delivered to the spray nozzle. The filter assembly also includes a cage in which the felt plug is received and which cage carries a wire screen in the opening which communicates with the spray nozzle.

For a full and more complete understanding of the invention, reference may be had to the following description and accompanying drawings wherein:

Figure 1 is a view in side elevation of a spray nozzle having a filter assembly mounted thereon in accordance with the precepts of this invention.

Figure 2 is a longitudinal section through the filter holding cage with the felt plug therein and spray nozzle omitted.

Figure 3 is a detailed perspective of the retaining ring per se.

Figure 4 is a detailed perspective of the disc screen.

Figure 5 is a detailed perspective of the felt plug.

Figure 6 is a side view partially in elevation but with parts broken away and shown in section of a modification in which the filter holding cage is enclosed by a cylindrical screen.

Figure 7 is another view partially in elevation but with parts broken away and shown in section of still another modification in which an adapter is included.

Figure 8 is a similar view of still another modification.

Figure 9 is another view partially in elevation and partially in section of another modification.

Figure 10 is a side view partly in section and partly in elevation of another modification.

Figure 11 is a view in side elevation of the filter assembly per se of Figure 10.

Figure 12 is another side view partly in section and partly in elevation showing a modified form of filter assembly as mounted in a body or coupling rather than the nozzle.

Figure 13 is a top plan view of the filter assembly shown in Figure 12.

Figure 14 is a bottom plan view; and

Figure 15 is a bottom plan view of a slight modification.

Referring now to the drawings wherein like reference characters denote corresponding parts, and first more particularly to Figures 1 to 5, inclusive, the preferred embodiment of the invention which is therein illustrated will be described. The filter assembly includes as an essential element a filter holder or cage which is referred to in its entirety by the reference character C. The cage C includes a cylindrical wall 10 having a bore 11 and formed with a plurality of circular ports 12. In the form of the invention illustrated in Figures 1 and 2 there are four of these ports 12 spaced ninety degrees apart. At one end the cylindrical wall or sleeve 10 is formed with external threads 13, which are screwed into a complemental threaded socket in the spray nozzle N depicted in Figure 1. Immediately within these threads 13 the bore 11 is enlarged to provide a counterbore 14 which terminates in a flare or conical mouth 15.

At the end remote from the threads 13 the sleeve 10 carries a wall 16 which is comparatively thick as compared to the wall 10 and which extends beyond the wall 10 providing a flange 17 having a knurled surface as illustrated in Figure 1. The end wall 16 is formed with an opening or port 18 which communicates with the interior of the cage. A conical surface 19 bridges the gap between the port 18 and the bore 11.

A felt plug is illustrated in detail in Figure 5 and is designated 20. This felt plug may be made from any felt material having the desired filtering characteristics. Felt filters of this type are available on the market and purchasable as such. The felt plug 20 is shown as positioned within the cage C snugly filling the bore 11 with one end jammed against the conical wall 19 and conforming in shape thereto.

A disc screen is shown in Figure 4 and is designated 21. This screen 21 is of a wire mesh of a desired size and has a circular contour substantially conforming to the counterbore 14. It is fitted in this counterbore 14 and bears against an end of the felt plug 20. A retaining ring is illustrated in Figure 3 and designated 22. This retaining ring 22 bears against the disc screen 21 and holds the latter in position. The retaining ring 22 is preferably positioned in the counterbore 14 with a pressed fit which holds it in position. However, if desired, the counterbore 14 might be formed with threads and the ring 22 screwed thereinto.

While the manner in which the filter assembly above described functions is believed to be obvious from the description of the parts given, it may be briefly outlined by noting that fuel oil passes through the ports 12 and 18 into the fibrous mass of the felt plug 20. As it passes through this felt plug it is filtered. It finally emerges through the disc screen 21 which picks up any small particles which may be included in the fuel oil. From the screen 21 the filtered oil passes to the nozzle N that is mounted on the cage C at the threads 13. The nozzle N is formed with a fine orifice 9 which converts the oil into a spray.

First modification

Referring now to Figure 6, a modified form of the invention will be described. In the form shown in Figure 6 the structure of the cage C is substantially the same as described above in connection with Figures 1 and 2 except that the wall 16 is solid and is not formed with any port or opening. Moreover, the flange 17 includes a top surface 23 that is conical or tapered. A cylindrical screen 24 is positioned about the cage C and its lower end engages this conical surface 23 on the flange 17. Fuel oil must pass through this screen 24 in order to get to the ports 12.

Second modification

Still another modified form of the invention is shown in Figure 7. In Figure 7 the cage is referred to by the reference character C1. The cage C1 includes an end wall 25 and a cylindrical wall 26 formed with slots 27 which establish communication between the interior and exterior of the cage. The cylindrical wall 26 has a bore 28 which receives the felt plug 20. This bore terminates at the end remote from the bottom 25 in a threaded counterbore 29. An adapter 30 has a neck 31 which is screwed into this threaded counterbore 29. The adapter 30 also has an oppositely extended threaded neck 32 which is received in the spray nozzle N. Carried by the adapter 30 is a screen disc 33 which is comparable to the screen disc 21 and which is maintained assembled on the adapter by a retaining ring 34 which is comparable to the retaining ring 22.

It is evident that the screen 33 and ring 34 may be removed with the adapter 30 as a unit from the cage C1.

Third modification

A third modification of the invention is illustrated in Figure 8. In this form of the invention the cage is identified by the reference character C2. It comprises a cylindrical wall 35 having a bore 36 which is enlarged at the lower end to provide a counterbore 37. Around this counterbored portion the wall 35 is slightly thickened and the external thickened surface provided with knurls as indicated at 38. The wall 35 is formed with the usual ports 39.

At the end remote from the counterbore 37 the cage C2 is formed with a shoulder 40 and upstanding from this shoulder is a threaded neck 41 which receives the spray nozzle N.

A disc screen 42 which is comparable to the screens 21 and 33 is positioned against the shoulder 40. The felt plug 20 is then positioned and bears against this screen forcing the latter against the shoulder. A retaining ring 43 bears against this felt plug 20 and is positioned in the counterbore 37 with a pressed fit.

Fourth modification

A final modification of the invention is illustrated in Figure 9. In this form the cage is identified by the reference character C3. The cage C3 comprises a cylindrical wall or sleeve 44 that is formed with a plurality of cross cuts 45. The sleeve 44 has a bore 46 which terminates at one end in an inwardly extending flange 47. Bearing against this flange 47 is a screen disc 48. Forcing the disc 48 against the flange 47 is a felt plug 20. The latter is held in position in the bore 46 by an end closure 49 having a flange 50 that is forced into the bore 46 with a pressed fit. The end closure 49 includes a knurled surface 50 which has a diameter greater than the sleeve 44. It is evident that a spray nozzle N may be mounted on threads 51 which are provided at the end remote from the closure 49.

Fifth modification

Figure 10 shows a nozzle N1 having a dome-like portion 52 and an extension 53 which is both internally and externally threaded. A body or coupling member 54 is internally threaded at one end and screwed into this internally threaded portion is the threaded extension 53.

Within the dome 52 is a conical seat 55 with an orifice 56 extending through the dome and located at the apex of the conical seat. A core member 57 has an upper conical surface 58 in engagement with the seat 55 and this surface is formed with cuts or kerfs 59. Extending radially outwardly about the core member 57 is a flange 60 presenting a downwardly exposed shoulder 61. The core member 57 also carries a downwardly depending skirt 62, the upper edge of which is spaced from the shoulder 61 by an annular recess 63.

The filter assembly includes as its main element a filter holding cage which is referred to in its entirety by the reference character C4. The cage C4 includes a central body member 64 which is externally threaded and screwed into the internal threads of the neck 53. Extending upwardly from the body member 64 is a tubular extension 65 formed with ports 66. This tubular extension 65 encloses the skirt 62 and at its upper end edge engages the shoulder 61 of the flange 60 so as to hold the core member 57 in position within the nozzle N1 with the conical surface 58 in engagement with the conical seat 55.

Depending downwardly from the body portion 64 is a lower tubular extension 67 terminating at its lower end in an enlarged thickened portion which is formed as a hex 68 for wrench-engaging purposes. This extension 67 is formed with ports 69 and positioned therewithin is a filter plug 70. The filter plug 70 engages a screen disc 71 at its upper end and this screen disc bears against an internal shoulder 72 formed in the main body portion 64. A retaining ring 73 engages the lower end of the filter plug 70 and being mounted in a counterbored portion of the lower extension 67 with a pressed fit holds the plug 70 in position.

It is evident that the filter holding cage C4 not only carries the essential elements of the filter assembly but also serves as a means for maintaining the core 55 in proper position within the nozzle N1.

*Sixth modification*

Figure 12 shows a body member or coupling 54 which is substantially identical with the same body member or coupling shown in Figure 10 wherein it is similarly designated. The coupling member 54 has a bore 74, the upper portion of which is threaded and shown at 75. This bore 74 terminates in a truncated conical shoulder 76. The end portion opposite to the threads 75 is of increased thickness and externally formed as a hex 77 for wrench-engaging purposes. This thickened portion is also formed with a tapered threaded socket 78 whereby it is adapted for connection to a fuel oil conduit.

A filter assembly is shown as including a cage C5 as its main element. The cage C5 comprises a body portion 79 which is externally threaded as represented at 80 and the threads 80 are screwed into the threads 75 to position the cage C5 within the bore 74. The main body portion 79 is formed with a central bore 81 and the upper surface thereof is formed with a crosscut 82 which is adapted to receive a screw driver for the purpose of screwing the cage C4 into the threads 75.

The bore 81 terminates at a shoulder 83, and bearing against this shoulder is a screen disc 84. Depending downwardly from the main body portion 79 is a tubular extension or sleeve 85 formed with ports 86 and having an internal bore 87. Received in the bore 87 is a felt filter plug 88 and the upper end of this plug bears against the screen disc 84. The felt plug 88 is held in position by a retaining ring 89 which is fitted into a counterbored section by a pressed fit.

There will be occasions when the cage C5 will be screwed down sufficiently far to cause the lower edge of the sleeve 85 to engage the seat 76. Moreover, this lower end edge is ordinarily of the conical formation depicted at 90 so that if this engagement takes place oil will be prevented from flowing out about the cage C5. To avoid this condition one or two arrangements may be employed. Figure 14 shows the lower end edge of the sleeve 85 as cut away at diametrically opposite points 91 through which the fuel oil may pass. Figure 15 shows a slightly different arrangement in which the lower end of the sleeve 85 is formed with four notches or cuts 92 which are spaced ninety degrees apart.

While preferred specific embodiments of the invention are hereinbefore set forth, it is to be clearly understood that the invention is not to be limited to the exact constructions, mechanisms, and devices illustrated and described because various modifications of these details may be provided in putting the invention into practice within the purview of the appended claims.

What is claimed is:

1. In combination, an atomizing oil burner nozzle having a fine orifice, a filter holding cage comprising a cylindrical member having a bore with one end of the bore communicating with said nozzle, said cage being formed with a plurality of ports establishing communication between the interior and exterior thereof, a threaded connection between one end of said cage and said nozzle, a felt filter plug in said cage, a screen disc over said filter plug at said end which communicates with said nozzle, and means for retaining said disc and plug within said cage.

2. In combination, an oil burner nozzle, a filter holding cage comprising a cylindrical wall having a bore which is closed at one end by an end wall and having its opposite end communicating with said nozzle, said cylindrical wall being formed with a plurality of ports, a threaded connection between said cylindrical wall and nozzle, a felt filter plug in said bore, a screen disc positioned against said plug in said bore at the end which communicates with the nozzle, and a retaining ring fitted in said cage with a pressed fit for maintaining said screen disc and plug assembled in said cage.

3. In combination, an oil burner nozzle, a filter holding cage comprising a cylindrical wall having a bore which is closed at one end by an end wall and having its opposite end communicating with said nozzle, said cylindrical wall being formed with a plurality of ports, a threaded connection between said cylindrical wall and nozzle, a felt filter plug in said bore, means for maintaining said plug assembled in said bore, and a cylindrical wire screen carried by said cage and disposed about the cylindrical wall thereof.

4. In combination, an oil burner nozzle, a filter holding cage comprising a cylindrical wall having a bore which is closed at one end by an end wall and having its opposite end communicating with said nozzle, said cylindrical wall being formed with a plurality of ports, a threaded connection between said cylindrical wall and nozzle, a felt filter plug in said bore, a screen disc positioned against said plug in said bore at the end which communicates with the nozzle, a retaining ring fitted in said cage with a pressed fit for maintaining said screen disc and plug assembled in said cage, and a cylindrical screen carried by said cage and enclosing said ports.

5. In combination, an oil burner nozzle having a threaded socket, a filter holding cage having a bore terminating at one end in a threaded portion, an adapter having threaded sections received in said socket and threaded end of said bore respectively, said cage having a cylindrical wall formed with a plurality of openings therein, and a felt filter plug in said cage.

6. In combination, an oil burner nozzle having a threaded socket, a filter holding cage having a bore terminating at one end in a threaded portion, an adapter having threaded sections received in said socket and threaded end of said bore respectively, a screen disc carried by said adapter, said cage being formed with a plurality of longitudinal slots, and a felt filter plug in said cage.

7. In combination, an oil burner nozzle, a filter holding cage comprising a cylindrical wall formed with ports and having a neck of reduced diameter which is separated from said wall by a shoulder and externally threaded, the threaded portion being screwed into said nozzle, a screen disc in said cage bearing against said shoulder, a felt filter plug in said cage bearing against said screen disc, and means for maintaining said plug assembled in said cage.

8. In combination, an oil burner nozzle, a filter holding cage comprising a cylindrical wall having one end threaded for connection to said nozzle, said cylindrical wall being formed with a plurality of circumferential slots, and having a bore, a filter plug in said bore, and an end closure received in said bore and maintaining said filtered plug assembled therein.

9. In combination, an oil burner nozzle, a filter holding cage comprising a cylindrical wall having one end threaded for connection to said nozzle, said cylindrical wall being formed with a plurality of circumferential slots, and having a bore, said bore terminating in an inwardly extending flange at the end which is secured to said nozzle, a screen in said bore engaging said flange, a felt filter plug in said bore against said screen, and a closure member at the end of said bore remote from said flange and maintaining said plug and screen assembled therein.

WALTER V. CZARNECKI, JR.
CASIMER M. CZARNECKI.

REFERENCES CITED

The following references are of record in the file of this patent:

UNITED STATES PATENTS

| Number | Name | Date |
|---|---|---|
| 118,192 | Brown | Aug. 22, 1871 |
| 434,570 | Sargent | Aug. 19, 1890 |
| 1,782,531 | Fokker | Nov. 25, 1930 |
| 1,847,964 | Hull | Mar. 1, 1942 |

FOREIGN PATENTS

| Number | Country | Date |
|---|---|---|
| 24,177 | Denmark | Mar. 3, 1919 |
| 222,229 | Great Britain | Oct. 2, 1924 |